(12) United States Patent
Tajima

(10) Patent No.: US 6,836,277 B2
(45) Date of Patent: Dec. 28, 2004

(54) SENSOR ATTACHMENT POSITION DETERMINING METHOD, IMAGE FORMING APPARATUS, AND IMAGE FORMING METHOD

(75) Inventor: Naoki Tajima, Hachioji (JP)

(73) Assignee: Konica Corporation, Tokyo (JP)

(*) Notice: Subject to any disclaimer, the term of this patent is extended or adjusted under 35 U.S.C. 154(b) by 0 days.

(21) Appl. No.: 10/647,354

(22) Filed: Aug. 25, 2003

(65) Prior Publication Data

US 2004/0041895 A1 Mar. 4, 2004

(30) Foreign Application Priority Data

Aug. 29, 2002 (JP) .................................. 2002-251700

(51) Int. Cl.⁷ .............................................. B41J 2/435
(52) U.S. Cl. .................... 347/232; 399/49; 399/160; 399/167; 399/165; 399/126; 347/116
(58) Field of Search .................................. 347/225, 232, 347/116, 234; 399/49, 72, 75–76, 78, 160, 162, 165, 126; 430/22

(56) References Cited

U.S. PATENT DOCUMENTS

| | | | | |
|---|---|---|---|---|
| 5,291,245 A | * | 3/1994 | Charnitski | 399/51 |
| 5,394,223 A | * | 2/1995 | Hart et al. | 347/116 |
| 5,574,527 A | * | 11/1996 | Folkins | 399/9 |
| 5,652,946 A | * | 7/1997 | Schuer | 399/49 |
| 5,710,958 A | * | 1/1998 | Raj | 399/49 |
| 5,966,573 A | * | 10/1999 | Yu et al. | 399/160 |
| 6,324,375 B1 | * | 11/2001 | Hada et al. | 399/301 |
| 6,374,076 B1 | * | 4/2002 | Tanaka | 399/396 |
| 6,426,767 B1 | * | 7/2002 | Tanimoto et al. | 347/115 |
| 2003/0129000 A1 | * | 7/2003 | Lee et al. | 399/165 |

* cited by examiner

Primary Examiner—Eugene H. Eickholt
(74) Attorney, Agent, or Firm—Cohen, Pontani, Lieberman & Pavane

(57) ABSTRACT

In this invention, the relationship between the attachment position of a sensor and the formation positional shift of a color image is checked by moving a color misregistration detection sensor along an attachment position candidate line that is defined in advance in a direction perpendicular to the rotational direction of an endless-belt-shaped transfer body. A specific attachment position on the sensor attachment position candidate line, at which color misregistration of the color image at a side edge portion of the transfer body becomes equal to the maximum value of color misregistration at a portion except the side edge portion, is found. The sensor is fixed at a position that satisfies the specific attachment position and opposes the color image formation surface of the transfer body. Accordingly, the image forming apparatus is controlled to correct color overlay on the basis of the detection signal of the color image by the sensor. As a result, the color misregistration on the entire color image formation surface can be minimized. Additionally, a high-quality color image with minimum color misregistration can be formed.

19 Claims, 12 Drawing Sheets

SENSOR ATTACHMENT POSITION DETERMINING METHOD, IMAGE FORMING APPARATUS, AND IMAGE FORMING METHOD

BACKGROUND OF THE INVENTION

1. Field of the Invention

The present invention relates to a sensor attachment position determining method which can suitably be applied to a color image forming apparatus for forming a color image by scanning and exposing a photosensitive body with a light beam and overlaying colors, and an image forming apparatus and an image forming method.

2. Description of the Prior Art

In recent years, tandem-type color printers, copying machines, and composite machines thereof are widely used. In these color image forming apparatuses, scanning optical units, developing units, and photosensitive drums for yellow (Y), magenta (M), cyan (C), and black (BK), an intermediate transfer belt, and a fixing unit are prepared.

For example, in the Y-color scanning optical unit, an electrostatic latent image is formed on the photosensitive drum on the basis of arbitrary image information. The developing unit applies a Y-color toner to the electrostatic latent image formed on the photosensitive drum to form a color toner image. The photosensitive drum transfers the toner image to the intermediate transfer belt. The same process is performed for the remaining colors, i.e., M, C and BK. Color toner images transferred to the intermediate transfer belt are transferred to a paper sheet (transfer paper sheet) and fixed by the fixing unit.

According to a color image forming apparatus of this type, color toner images must be formed on the intermediate transfer belt without any color misregistration in order to transfer the color toner images having no color misregistration to a paper sheet. For this purpose, the positions and tilts of the scanning optical units described above are appropriately adjusted with respect to the photosensitive drums.

The intermediate transfer belt of the color image forming apparatus is subjected to a process called "color registration mark detection" periodically or irregularly before formation of a color image based on arbitrary image information. As shown in FIG. 1A, in this detection process, almost V-shaped color registration marks (to also be simply referred to as "registration marks" hereinafter) on an intermediate transfer belt 6 are detected by using reflection-type photosensors (to also be referred to as registration sensors hereinafter) 12A and 12B which are arranged above the two side edge portions of the intermediate transfer belt 6.

As shown in FIG. 1B, the registration sensor 12A comprises a light projecting element SS1 formed from an LED that projects a light beam to the intermediate transfer belt 6, a light receiving element SS2 which receives reflected light from the intermediate transfer belt 6, and lenses SS3. The registration sensor 12B has the same structure as that of the registration sensor 12A.

Light beams emitted from the registration sensors 12A and 12B are shielded by, e.g., registration marks on the intermediate transfer belt 6. In this process, the registration marks are detected by detecting light reflected by the intermediate transfer belt 6.

As shown in FIG. 1A, a positional shift in the sub scanning direction (bow) is detected on the basis of the timing of the detection signal of a line segment P that is parallel to the main scanning direction D1 of the registration marks arrayed in the main scanning direction D1.

In addition, a partial lateral magnification difference "m" is detected on the basis of the difference between the timing of detection of the line segments P that are parallel to the main scanning direction D1 of the registration marks and the timing of detection of line segments Q that have a tilt of 45° with respect to the main scanning direction D1 of the registration marks. The partial lateral magnification difference "m" means a partial variation in magnification in the main scanning direction D1. The partial lateral magnification difference m has adverse effects such as a horizontal image write positional shift on the photosensitive body. On the basis of the pieces of information (detection signals) related to the partial lateral magnification difference "m" and positional shift in the sub scanning direction D2, which are detected by the registration sensors 12A and 12B, the position and tilt of each scanning optical unit are controlled to eliminate color misregistration between the respective color images.

According to the conventional "color registration mark detection", the registration sensors 12A and 12B are arranged above the side edge portions of the intermediate transfer belt 6 to detect the partial lateral magnification difference "m" and/or positional shift in the sub scanning direction. On the basis of the detection signals, the position and tilt of each scanning optical unit are controlled.

However, the scanning accuracy may vary between the scanning optical units due to the assembly errors of the scanning optical units in the color image forming apparatus or the internal temperature distribution in the color image forming apparatus. Accordingly, at any portion except the side edge portions of the intermediate transfer belt 6 where the registration sensors 12A and 12B are arranged, a considerable difference in partial lateral magnification difference "m" and/or positional shift in the sub scanning direction may be generated between the scanning optical units.

If a large difference in partial lateral magnification difference "m" and/or color misregistration in the sub scanning direction over the main scanning direction, namely, a scanning line bend is generated between the scanning optical units, the overlay accuracy between Y, M, C and BK colors decreases. This causes conspicuous color misregistration in the color image.

SUMMARY OF THE INVENTION

The present invention has been made to solve the above problem in the prior art, and has as its object to provide a sensor attachment position determining method, an image forming apparatus, and an image forming method, which can minimize color misregistration on the entire color image formation surface and also form a high-quality color image with minimum color misregistration.

In order to achieve the above object, according to the first aspect of the present invention, there is provided a sensor attachment position determining method of determining an attachment position of a color misregistration detection sensor of an image forming apparatus which overlays colors on the basis of arbitrary image information to form a color image on an endless-belt-shaped transfer body that is rotatable in a predetermined direction, comprising the steps, which are carried out in a stage of designing the image forming apparatus, of: checking a relationship between the attachment position of the sensor and a formation positional shift of the color image by moving the sensor along an attachment position candidate line that is defined in advance in another direction perpendicular to the rotational direction of the transfer body; finding a specific attachment position on the sensor attachment position candidate line, at which color misregistration of the color image at a side edge portion of the transfer body becomes equal to a maximum value of color misregistration at a portion except the side edge portion; and fixing the sensor at a position that satisfies the found specific attachment position and opposes a color image formation surface of the transfer body.

According to the sensor attachment position determining method, the image forming apparatus can be controlled to correct the color overlay on the basis of a reliable detection signal for which the color misregistration of the color image at the side edge portion of the transfer body becomes equal to the maximum value of color misregistration at a portion except the side edge portion. The color overlay for color image formation can be corrected to eliminate the absolute amount difference of the color misregistration between the central portion in the widthwise direction and the side edge portion of the transfer body.

In order to achieve the above object, according to the second aspect of the present invention, there is provided an image forming apparatus which overlays colors on the basis of arbitrary image information to form a color image, comprising: an endless-belt-shaped transfer body which is rotatable in a predetermined direction; image forming means for overlaying the colors on the basis of the image information to form the color image on the transfer body; color misregistration detection sensor means, arranged to be movable along an attachment position candidate line that is defined in advance in another direction perpendicular to the rotational direction of the transfer body, for detecting color misregistration of the color image formed on the transfer body by the image forming means; and control means for controlling the image forming means to correct color overlay on the basis of a detection signal of the color image by the sensor, wherein the sensor means is fixed at a position that satisfies a specific attachment position at which color misregistration of the color image at a side edge portion of the transfer body becomes equal to a maximum value of color misregistration at a portion except the side edge portion and opposes a color image formation surface of the transfer body.

According to the image forming apparatus, the image forming means for overlaying the colors on the basis of the arbitrary image information to form the color image on the transfer body is controlled to correct the color overlay on the basis of the detection signal of the color image by the color misregistration detection sensor. The sensor menas is attached to a position at which the color misregistration of the color image at the side edge portion of the transfer body becomes equal to the maximum value of color misregistration at a portion except the side edge portion. Hence, color overlay correction can be optimized to eliminate the absolute amount difference of the color misregistration between the central portion in the widthwise direction and the side edge portion of the transfer body. The color misregistration on the entire color image formation surface can be minimized.

In order to achieve the above object, according to the third aspect of the present invention, there is provided an image forming method of causing an image forming system to overlay colors on the basis of arbitrary image information to form a color image on an endless-belt-shaped transfer body that is rotatable in a predetermined direction, comprising the steps, which are carried out in a stage of designing the image forming apparatus, of: checking a relationship between the attachment position of the sensor and a formation positional shift of the color image by moving the sensor along a sensor attachment position candidate line that is defined in advance in another direction perpendicular to the rotational direction of the transfer body; finding a specific attachment position on the sensor attachment position candidate line, at which color misregistration of the color image at a side edge portion of the transfer body becomes equal to a maximum value of color misregistration at a portion except the side edge portion; fixing the sensor at a position that satisfies the found specific attachment position and opposes a color image formation surface of the transfer body; and controlling the image forming system to correct color overlay on the basis of a detection signal of the color image by the sensor.

According to the color image forming method, since the above-described sensor attachment position determining method is applied, the color overlay of the color image can be corrected to eliminate the absolute amount difference of the color misregistration between the central portion and the side edge portion of the rotatable transfer body having an endless belt shape. Hence, the color misregistration on the entire color image formation surface can be minimized.

As is apparent from the above aspects, according to the sensor attachment position determining method of the present invention, the image forming apparatus can be controlled to correct the color overlay on the basis of a reliable detection signal for which the color misregistration of the color image at the side edge portion of the transfer body becomes equal to the maximum value of color misregistration at a portion except the side edge portion. The color overlay of the color image can be corrected to eliminate the absolute amount difference of the color misregistration between the central portion in the widthwise direction and the two side edge portions of the transfer body. Hence, the color misregistration on the entire color image formation surface can be minimized, and the quality of the color image can be increased.

According to the image forming apparatus of the present invention, the color overlay correction can be optimized to eliminate the absolute amount difference of the color misregistration between the central portion and the two side edge portions of the transfer body. The color misregistration on the entire color image formation surface can be minimized. Hence, a high-quality color image with minimum color misregistration can be formed.

According to the color image forming method of the present invention, the color overlay of the color image can be corrected to eliminate the absolute amount difference of the color misregistration between the central portion in the widthwise direction and the two side edge portions of the rotatable transfer body having an endless belt shape. The color misregistration on the entire color image formation surface can be minimized. Hence, the quality of the color image can be increased.

The present invention can be suitably applied to a tandem-type color printer or copying machine, which has an intermediate transfer belt or photosensitive belt, or a composite machine thereof.

The above and many other objects, features and advantages of the present invention will become manifest to those skilled in the art upon making reference to the following detailed description and accompanying drawings in which preferred embodiments incorporating the principle of the present invention are shown by way of illustrative examples.

DETAILED DESCRIPTION OF THE PREFERRED EMBODIMENTS

Image forming apparatuses and methods according to preferred embodiments of the present invention will be described below with reference to the accompanying drawings.

In the present invention, the relationship between a sensor attachment position and the formation positional shift of a color image is checked by moving a sensor along an attachment position candidate line defined in a direction perpendicular to the rotational direction of a transfer body having an endless belt shape. A specific attachment position on the sensor attachment position candidate line, at which the color misregistration of the color image at a side edge portion of the transfer body becomes equal to the maximum value of the color misregistration at a portion except the side edge portion, is found. The sensor is arranged at a position that satisfies the specific attachment position and opposes the color image formation surface of the transfer body. Accordingly, the image forming apparatus is controlled to correct color overlay on the basis of the detection signal of the color image by the sensor. As a result, the color misregistration on the entire color image formation surface can be minimized. In addition, a high-quality color image with minimum color misregistration can be formed.

The arrangement of a color image forming apparatus main body 101 to which the sensor attachment position determining method according to the present invention is applied will be described first with reference to FIG. 2.

Figure 1A:
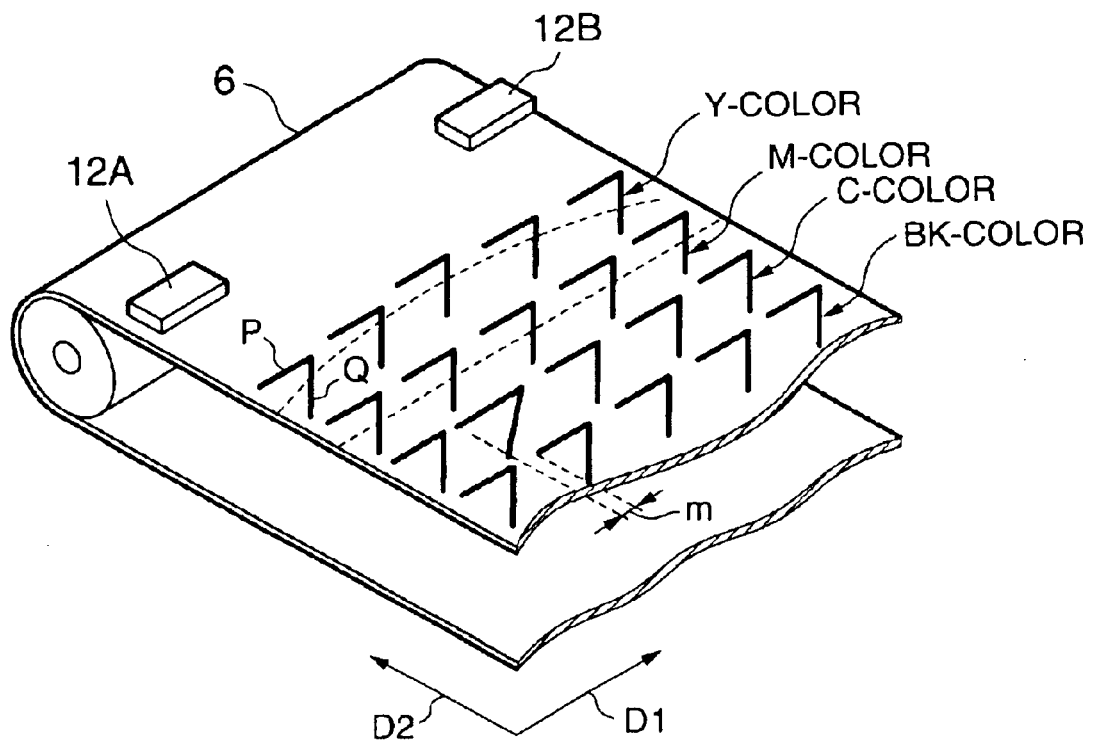
FIGS. 1A and 1B are views showing an example of color registration mark detection.
Figure 1B:
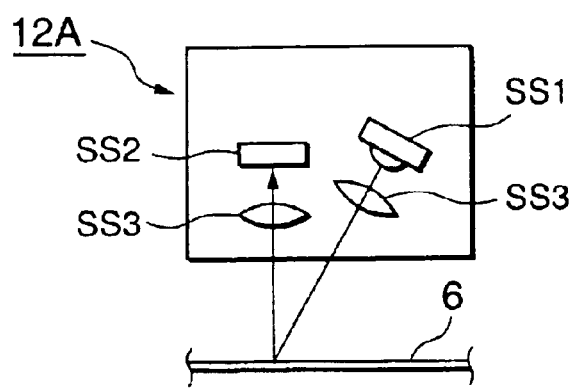
Figure 2:
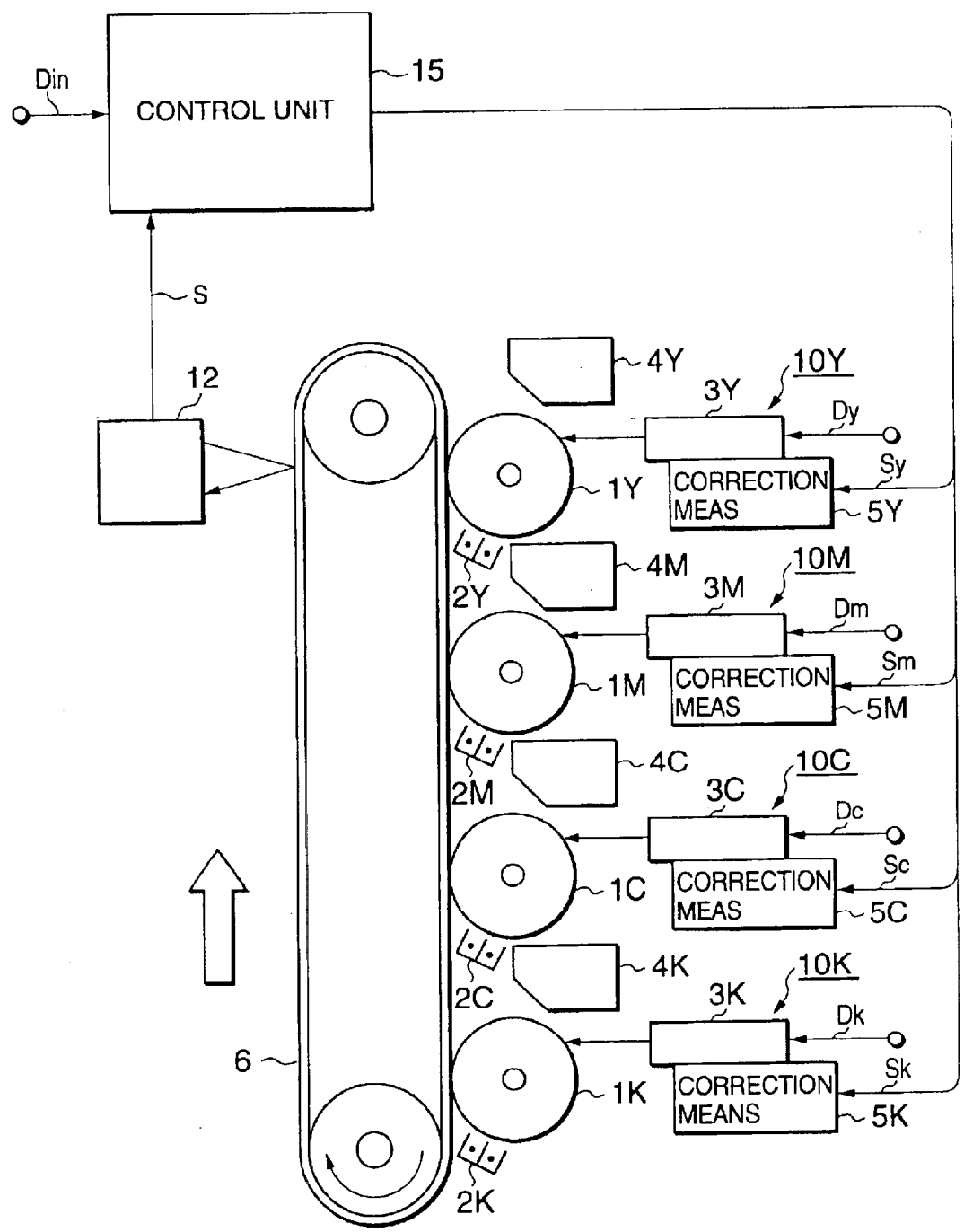
FIG. 2 is a block diagram showing the arrangement of a color image forming apparatus main body according to the first embodiment of the present invention.

FIG. 2 is a block diagram showing the arrangement of the color image forming apparatus main body 101. The color image forming apparatus main body 101 is also called a tandem-type color image forming apparatus. The color image forming apparatus main body 101 has a plurality of image forming units 10Y, 10M, 10C, and 10K, an intermediate transfer belt 6 as an example of a transfer body, a registration sensor 12 as an example of the color misregistration detection sensor, and a control unit 15. The color image forming apparatus main body 101 is an apparatus which causes the plurality of image forming units 10Y, 10M, 10C, and 10K to overlay colors on the basis of arbitrary image information to form a color image on the intermediate transfer belt 6.

Referring to FIG. 2, the image forming unit 10Y which forms a yellow (Y) image has a photosensitive drum 1Y, a Y-color charging means 2Y which is arranged around the photosensitive drum 1Y, a scanning optical unit 3Y, a developing unit 4Y, and an image forming body cleaning means (not shown). The image forming unit 10M which forms a magenta (M) image has a photosensitive drum 1M, an M-color charging means 2M, a scanning optical unit 3M, a developing unit 4M, and an image forming body cleaning means (not shown). The image forming unit 10C which forms a cyan (C) image has a photosensitive drum 1C, a C-color charging means 2C, a scanning optical unit 3C, a developing unit 4C, and an image forming body cleaning means (not shown). The image forming unit 10K which forms a black (BK) color image has a photosensitive drum 1K, a BK-color charging means 2K, a scanning optical unit 3K, a developing unit 4K, and an image forming body cleaning means (not shown).

Latent images are formed on the photosensitive drums 1Y, 1M, 1C, and 1K by the charging means 2Y and scanning optical unit 3Y, charging means 2M and scanning optical unit 3M, charging means 2C and scanning optical unit 3C, and charging means 2K and scanning optical unit 3K, respectively.

Development by the developing units 4Y, 4M, 4C, and 4K is done by reversal processing in which a development bias is applied by superposing an AC voltage on a DC voltage having the same polarity (negative polarity in this embodiment) as that of the toners used.

As shown in FIG. 2, the intermediate transfer belt 6 is wound around a plurality of rollers and supported to be rotatable in a predetermined direction. Color toner images transferred to the intermediate transfer belt 6 are further transferred to a paper sheet (not shown) and fixed to the paper sheet by a fixing unit.

The registration sensor 12 is a reflection-type photosensor and is used to detect the color misregistration of a color image formed on the intermediate transfer belt 6. For example, the registration sensor 12 is used for the above-described process called "color registration mark detection". The registration sensor 12 detects the position of a registration mark and outputs a position detection signal S. The number of registration sensors 12 and their attachment positions will be described later.

The control unit 15 is connected to the registration sensor 12. The control unit 15 controls the image forming units 10Y, 10M, 10C, and 10K on the basis of the position detection signal S obtained from the registration sensor 12.

Depending on the control contents of the control unit 15, one or all of the three image forming units 10Y, 10M, and 10C may be controlled with reference to the image forming unit 10K. Accordingly, the load of the control unit 15 can be reduced. The intermediate transfer belt 6 may also be controlled. In this case, a meander correction mechanism (not shown) may be used to correct meander of the intermediate transfer belt 6 and adjust color misregistration.

The image forming units 10Y, 10M, 10C, and 10K are connected to the control unit 15. In the image forming unit 10Y, a Y-color toner image is formed on the intermediate transfer belt 6 on the basis of Y-color image information Dy that constitutes arbitrary image information Din. In the image forming unit 10M, an M-color toner image is formed on the intermediate transfer belt 6 on the basis of M-color image information Dm. In the image forming unit 10C, a C-color toner image is formed on the intermediate transfer belt 6 on the basis of C-color image information Dc. In the image forming unit 10K, a BK-color toner image is formed on the intermediate transfer belt 6 on the basis of BK-color image information Dk.

A correction means 5Y is attached to the Y-color scanning optical unit 3Y. The correction means 5Y adjusts the formation position of the Y-color image on the basis of a Y-color write position correction signal Sy from the control unit 15. Similarly, a correction means 5M is attached to the M-color scanning optical unit 3M. The correction means 5M adjusts the formation position of the M-color image on the basis of an M-color write position correction signal Sm from the control unit 15. A correction means 5C is attached to the C-color scanning optical unit 3C. The correction means 5C adjusts the formation position of the C-color image on the basis of a C-color write position correction signal Sc from the control unit 15. A correction means 5K is attached to the BK-color scanning optical unit 3K. The correction means 5K adjusts the formation position of the BK-color image on the basis of a BK-color write position correction signal Sk from the control unit 15.

In the first embodiment, a color misregistration amount is calculated on the basis of BK-color registration marks in order to align the Y, M, and C color image write positions to that of the BK-color image.

For example, in adjusting the Y-color write position, the write position of the BK-color registration mark and that of the Y-color registration mark are detected. A correction amount is calculated from a shift amount obtained by converting the write position of the Y-color registration mark into that of the BK-color registration mark. Even in adjusting the M- or C-color write position, the shift amount between the write position of the BK-color registration mark and that of the M- or C-color registration mark is detected, and a correction amount is calculated from the shift amount. After that, the write positions in the Y-, M- and C-color image forming units 10Y, 10M, and 10C except the BK image forming unit 10K are adjusted in accordance with the correction amounts.

Hence, in the BK-color image forming unit, write position adjustment in the normal main/sub scanning modes and the lateral magnification adjustment, partial lateral magnification adjustment, and skew adjustment in the image write unit 3K are executed by outputting only BK-color to the intermediate transfer belt 6. This aims at executing adjustment for BK-color and using the write position of BK-color as a reference. Then, registration adjustment is done to align the write positions of Y-, M- and C-colors in accordance with BK-color.

A method of determining the attachment position of the registration sensor 12 in the color image forming apparatus main body 101 will be described next.

Figure 3:
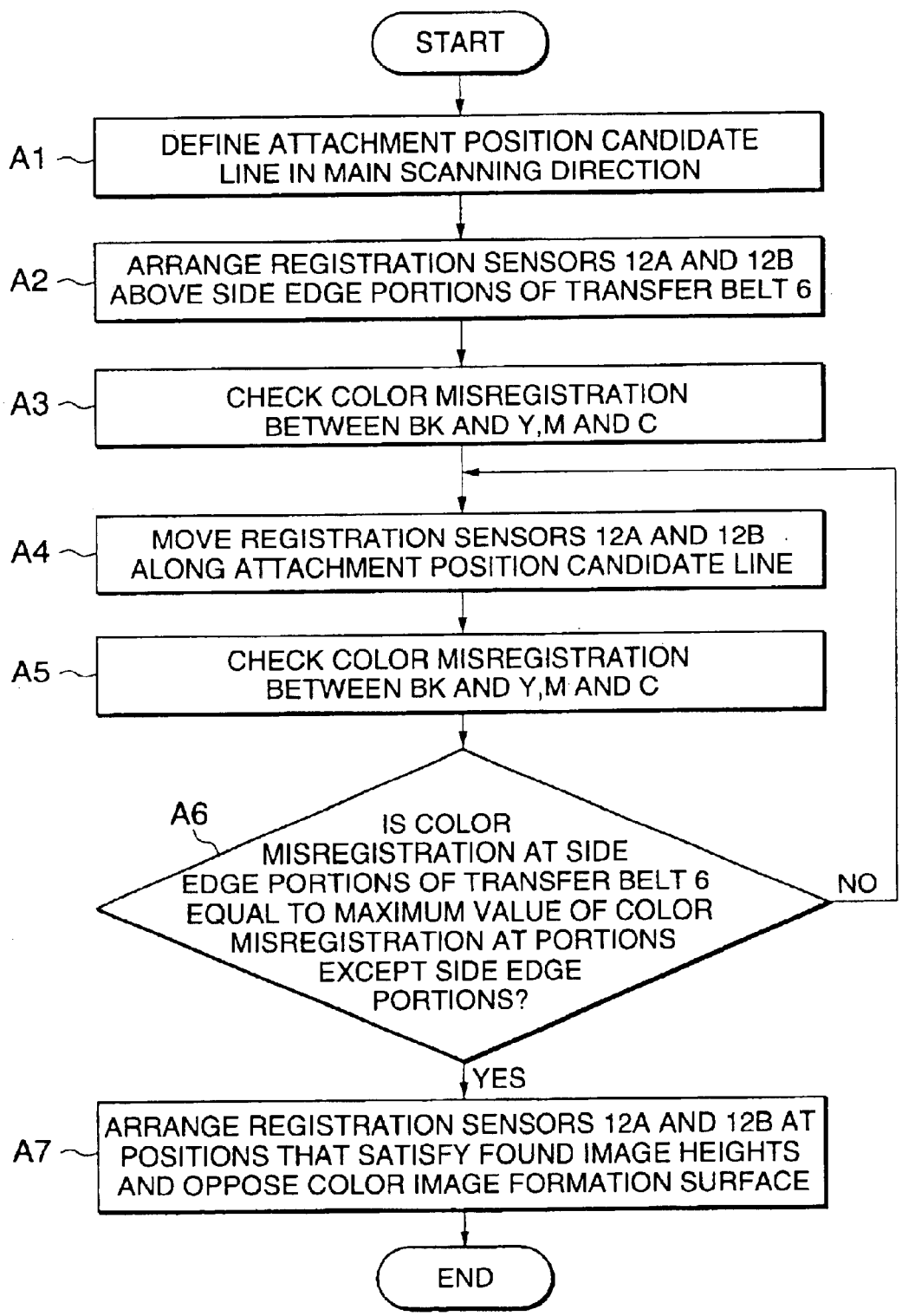
FIG. 3 is a flowchart showing a registration sensor attachment position determining method according to the first embodiment of the present invention.

FIG. 3 is a flowchart showing the method of determining the attachment position of the registration sensor 12 according to the present invention. The method of determining the attachment position of the registration sensor 12 will be described in accordance with the flowchart shown in FIG. 3 with reference to FIGS. 2 and 4.

Figure 4:
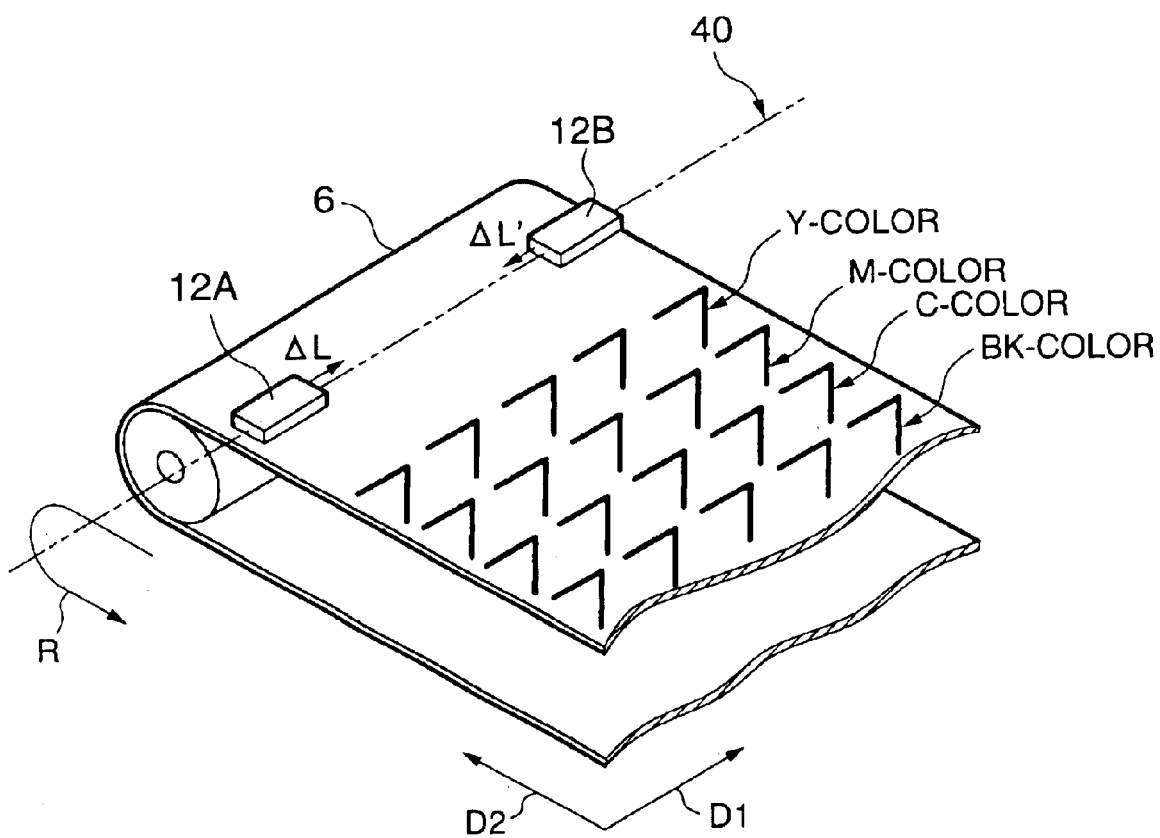
FIG. 4 is a perspective view showing an example of attachment of a pair of registration sensors.

First, in step A1 in FIG. 3, a rotational direction R of the intermediate transfer belt 6 is defined as a sub scanning direction D2, and a direction (another direction) perpendicular to the sub scanning direction D2 is defined as a main scanning direction D1. Additionally, a sensor attachment position candidate line 40 is defined on the intermediate transfer belt 6 along the main scanning direction D1. As shown in FIG. 4, the sensor attachment position candidate line 40 is not an actual line formed on the intermediate transfer belt 6 but a virtual line.

In step A2 in FIG. 3, a pair of registration sensors 12A and 12B are arranged above the side edge portions of the intermediate transfer belt 6. In step A3 in FIG. 3, the color misregistration between BK-color and Y-, M- and C-colors in the main scanning direction D1 is checked by using, as parameters, small positional shift amounts (to also be referred to as shifts hereinafter) in the directions of the optical axes of the scanning optical units 3Y, 3M, 3C, and 3K (the directions from the scanning optical units 3Y, 3M, 3C, and 3K to the photosensitive drums 1Y, 1M, 1C, and 1K).

More specifically, the scanning optical units 3Y, 3M, 3C, and 3K are attached to the color image forming apparatus main body 101 first while ensuring a predetermined attachment error in the direction of the optical axis. For example, in the assembly step of the color image forming apparatus main body 101, the attachment error of the scanning optical units 3Y, 3M, 3C, and 3K in the direction of the optical axis is about ±300 μm.

Next, by using the image forming units 10Y, 10M, 10C, and 10K respectively having the scanning optical units 3Y, 3M, 3C, and 3K with the above attachment error, Y-, M-, C- and BK-color registration marks are formed on the intermediate transfer belt 6. The registration marks are detected by the registration sensors 12A and 12B arranged above the side edge portions of the intermediate transfer belt 6, and the image forming units 10Y, 10M, 10C, and 10K are adjusted (lateral magnification adjustment).

After control of the image forming units 10Y, 10M, 10C, and 10K, the positional shift amounts of the Y-, M- and C-color registration marks in the main scanning direction are checked by using the BK-color registration marks as a reference. Registration mark detection after image forming unit control is done by using an image sensor CCD (not shown) which is arranged above the intermediate transfer belt 6 along the main-scanning direction independently of the registration sensors 12A and 12B.

Figure 5:
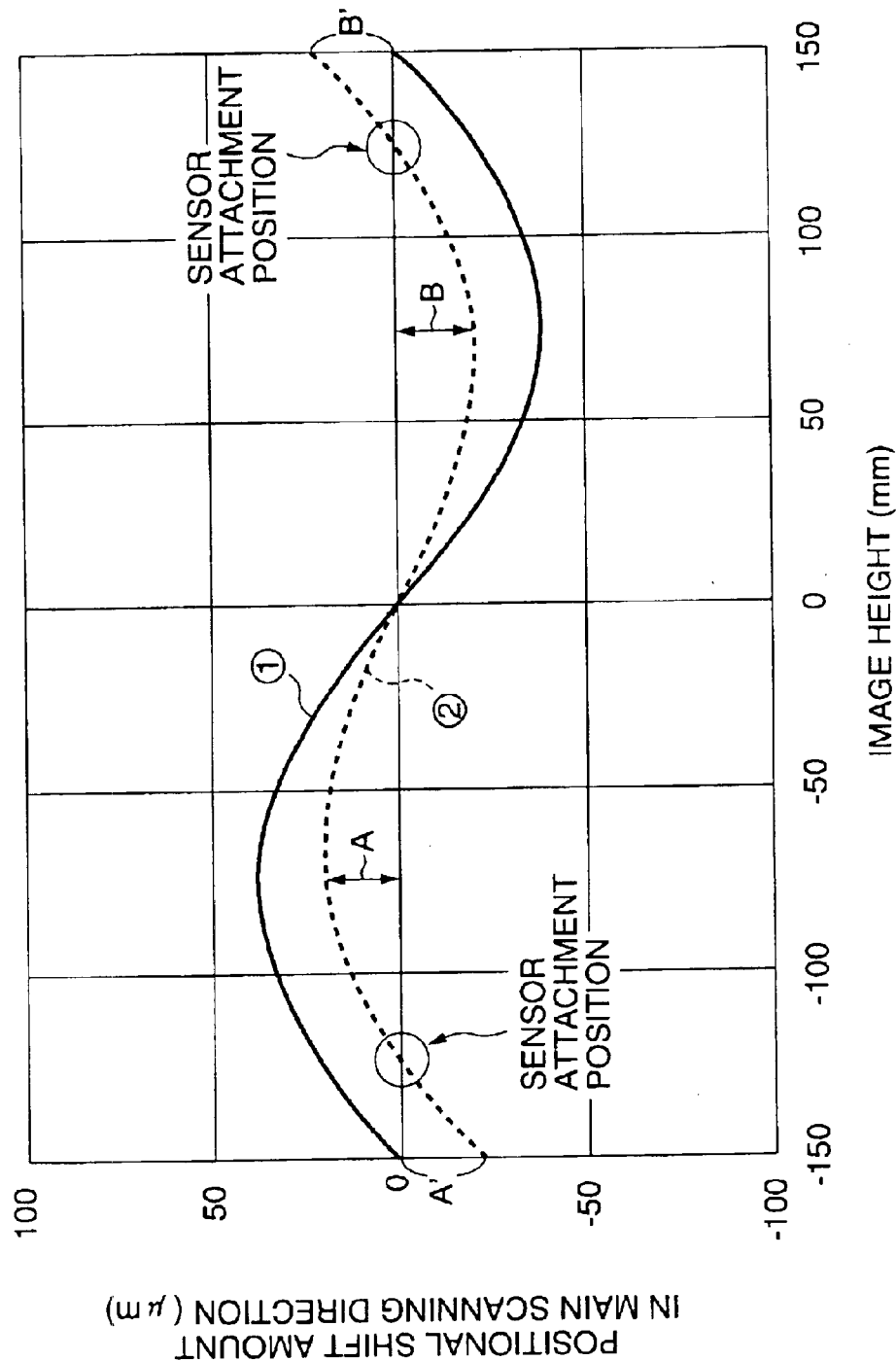
FIG. 5 is a graph showing an example of a partial lateral magnification difference generated by the attachment shifts of scanning optical units in the direction of the optical axis.

FIG. 5 is a graph showing an example of a partial lateral magnification difference generated by the attachment shifts of the scanning optical units 3Y, 3M, 3C, and 3K in the direction of the optical axis.

Referring to FIG. 5, the abscissa represents the image height. The image height means a scanning width centered on the optical axes of the scanning optical units 3Y, 3M, 3C, and 3K. The scanning width is directly reflected on the intermediate transfer belt 6. Hence, a position on the intermediate transfer belt 6 along the main scanning direction D1 is also referred to as an image height. More specifically, a position corresponding to an image height of 0 mm is the central portion in the widthwise direction of the intermediate transfer belt 6, which overlaps the optical axes of the scanning optical units 3Y, 3M, 3C, and 3K. Positions corresponding to images heights of −150 and 150 mm are the two side edge portions of the intermediate transfer belt 6. The outermost edge portions of images such as registration marks are formed at the two side edge portions.

Referring to FIG. 5, the ordinate represents the positional shift amounts in the main scanning direction of the Y-, M- and C-color registration marks with respect to the BK-color registration marks (to be also referred to as the positional shift amounts in the main scanning direction between BK-color and other respective colors hereinafter).

A curve ① shown in FIG. 5 indicates the relationship between the "image height" and the "positional shift amounts in the main scanning direction between BK-color and other respective colors", which is obtained in step A3 in FIG. 3.

In a state wherein the registration sensors 12A and 12B are arranged at the positions corresponding to the image heights of −150 and 150 mm, respectively, the positional shift amounts in the main scanning direction between BK-color and other respective colors at the image heights of −150, 0, and 150 mm are 0 $\mu$m. This is because when the shifts of the scanning optical units 3Y, 3M, 3C, and 3K in the direction of the optical axis are used as parameters, no positional shift is generated at the image height of 0 mm. It is also because the registration sensors 12A and 12B detect the Y-, M-, C- and BK-color registration marks formed at the positions corresponding to the image heights of −150 and 150 mm, and the image forming units 10Y, 10M, 10C, and 10K are controlled so as to eliminate the positional shifts of the Y-, M- and C-color registration marks with respect to the BK-color registration marks (lateral magnification adjustment).

In step A4 in FIG. 3, the registration sensors 12A and 12B are moved so as to be closed together through a registration sensor moving means, as shown in FIG. 4, from the positions corresponding to the image heights of −150 and 150 mm, i.e., two side edges of the intermediate transfer belt 6 toward the position corresponding to the image height of 0 mm, i.e., the central portion in the widthwise direction of the intermediate transfer belt 6 symmetrically by $\Delta L$ and $\Delta L'$, respectively, along the sensor attachment position candidate line 40. For the descriptive convenience, both the values $\Delta L$ and $\Delta L'$ are defined as 30 mm. Further, it should be noted that the registration sensor moving means is not actually mounted in a body of the color image forming apparatus, but is a virtual means used for convenience sake at the time of putting the method of determining the attachment position of the registration sensors in accordance with the flowchart shown in FIG. 3 into practice.

In step A5 in FIG. 3, the positional shift amounts in the main scanning direction between BK-color and other respective colors are checked. As in step A3 in FIG. 3, Y-, M-, C- and BK-color registration marks are formed on the intermediate transfer belt 6 by using the image forming units 10Y, 10M, 10C, and 10K respectively having the scanning optical units 3Y, 3M, 3C, and 3K with the attachment error. The registration sensors 12A and 12B arranged at the positions corresponding to image heights of −120 and 120 mm detects the registration marks, and the image forming units 10Y, 10M, 10C, and 10K are controlled.

After this control, the positional shift amounts in the main scanning direction between the BK-color registration marks and the Y-, M- and C-color registration marks are checked by using an image sensor CCD or the like.

A curve ② shown in FIG. 5 indicates the relationship between the "image height" and the "positional shift amounts in the main scanning direction between BK-color and other respective colors", which is obtained in step A5 in FIG. 3.

Next, in a state wherein the registration sensors 12A and 12B are arranged at the positions corresponding to the image heights of −120 and 120 mm, respectively, it is checked in step A6 in FIG. 3 whether the maximum value of the positional shift amounts in the main scanning direction between BK-color and other respective colors when the image height ranges from −150 mm to 0 mm (A in FIG. 5) is equal to the positional shift amounts in the main scanning direction between BK-color and other respective colors at the image height of −150 mm (A' in FIG. 5).

In addition, it is checked whether the maximum value of the positional shift amounts in the main scanning direction between BK-color and other respective colors when the image height ranges from 0 mm to 150 mm (B in FIG. 5) is equal to the positional shift amounts between BK and the respective colors in the main scanning direction at the image height of 150 mm (B' in FIG. 5).

When the maximum value A of the positional shift amounts in the image height range of −150 mm to 0 mm is equal to the positional shift amount A' at the image height of −150 mm, and the maximum value B of the positional shift amounts in the image height range of 0 mm to 150 mm is equal to the positional shift amount B' at the image height of 150 mm, the operation advances to step A7 in FIG. 3, the positional shift amounts in the main scanning direction between BK-color and other respective colors are checked while changing the respective registration sensor moving distances $\Delta L$ and $\Delta L'$. In case of A≠A' or B≠B', the operation flow returns to step A4 in FIG. 3. On the other hand, in case of A=A' and B=B', the "positional shift amount in the main scanning direction between BK-color and other respective colors" can be minimized.

In step A7 in FIG. 3, the registration sensors 12A and 12B are arranged at attachment positions that satisfy the image heights −120 and 120 mm and oppose the color image formation surface of the intermediate transfer belt 6. Registration sensor attachment position determination is thus completed. That is, the registration sensor attachment position is fixed in the stage of designing the image forming apparatus.

In the above-described registration sensor attachment position determining method, the shifts of the scanning optical units 3Y, 3M, 3C, and 3K in the direction of the optical axis are regarded as causes for color misregistration between Y-, M-, C- and BK-colors. The attachment positions of the registration sensors 12A and 12B are determined by using the shifts in the direction of the optical axis as parameters.

However, causes for color misregistration of a color image are not limited to the shifts of the scanning optical units 3Y, 3M, 3C, and 3K in the direction of the optical axis. For example, color misregistration of a color image may also be caused by component assembly errors in the scanning optical units 3Y, 3M, 3C, and 3K. Hence, the attachment positions of the registration sensors 12A and 12B may be determined by using, as parameters, not the shifts of the scanning optical units 3Y, 3M, 3C, and 3K in the direction of the optical axis but the component assembly errors in the scanning optical units 3Y, 3M, 3C, and 3K.

The internal structure of the scanning optical units 3Y, 3M, 3C, and 3K will be described here in association with the photosensitive drums 1Y, 1M, 1C, and 1K and correction means 5Y, 5M, 5C, and 5K.

Figure 6:
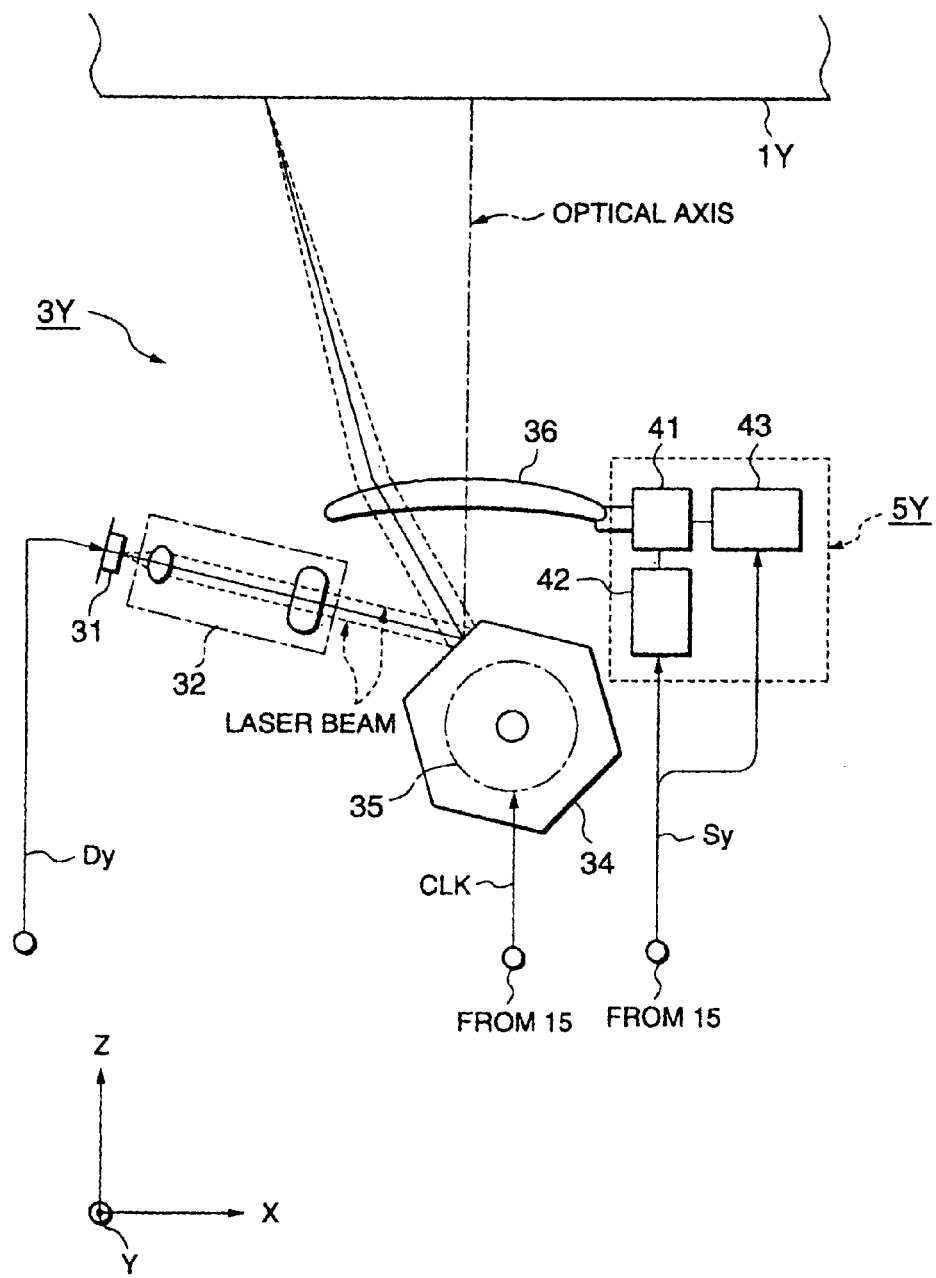
FIG. 6 is a view showing the internal structure of an image forming unit.

FIG. 6 is a view showing the internal structure of the image forming unit 10Y. The Y color scanning optical unit 3Y shown in FIG. 6 has a semiconductor laser source 31, a collimator unit 32 formed from an optical system, a polygon mirror 34, a polygon motor 35, and an f(θ) lens 36 as an example of an imaging lens. The semiconductor laser source 31 generates a laser beam on the basis of the Y color image information Dy. The laser beam emitted from the semiconductor laser source 31 is shaped into a predetermined light beam by the optical system.

The light beam is deflected by the polygon mirror 34 in the scanning direction. The polygon mirror 34 is rotated by the polygon motor 35 on the basis of a control signal CLK from the control unit 15. The light beam deflected by the polygon mirror 34 forms an image on the photosensitive drum 1Y through the f(θ) lens 36.

The correction means 5Y has a lens holding mechanism 41, f(θ) adjustment mechanism 42, and optical axis adjustment mechanism 43. The f(θ) lens 36 is attached to the lens holding mechanism 41. The lens holding mechanism 41 is attached to be movable with respect to the f(θ) adjustment mechanism 42 and optical axis adjustment mechanism 43. The f(θ) adjustment mechanism 42 moves and adjusts the lens holding mechanism 41 in the X or Y directions on the basis of the position correction signal Sy. The Y direction is perpendicular to the paper face of FIG. 6.

The optical axis adjustment mechanism 43 moves and adjusts the lens holding mechanism 41 in the Z direction (the direction of the optical axis) on the basis of the position correction signal Sy. The movement and adjustment of the mechanisms 42 and 43 are realized by using an actuator (piezoelectric element) or pitch control of a continuous thread stud to adjust the write position of the light beam on the photosensitive drum 1Y. The remaining image forming units 10M and 10C have the same structure as described above. The same process as described above is executed to eliminate the optical system positional shift between the f(θ) lenses 36 of the image forming units 10Y, 10M, 10C, and 10K.

In the image forming units 10Y, 10M, 10C, and 10K, for example, if the f(θ) lens 36 shifts in the X or Y directions due to the attachment error or the exit angle of the laser beam that exits from the collimator unit 32 shifts, color misregistration occurs in a color image. Hence, the attachment positions of the registration sensors 12A and 12B may be determined by using these factors as parameters. In this case, the method of determining the attachment position of the registration sensor 12, which has been described in accordance with the flowchart in FIG. 3, can be applied.

For example, a case wherein the shifts of the f(θ) lens 36 in the X or Y directions are used as parameters will be described in accordance with the flowchart in FIG. 3. In this case, steps A1, A2, A4, A6, and A7 in FIG. 3 are the same as those when the shifts of the scanning optical units 3Y, 3M, 3C, and 3K in the direction of the optical axis are used as parameters, and a detailed description thereof will be omitted.

In step A3 in FIG. 3, the f(θ) lens 36 is attached in each of the scanning optical units 3Y, 3M, 3C, and 3K while ensuring a predetermined attachment error in the X or Y directions. For example, in the assembly step of the color image forming apparatus main body 101, the attachment error of the f(θ) lens 36 in the X or Y directions is about ±300 μm.

Next, by using the image forming units 10Y, 10M, 10C, and 10K each having the f(θ) lens 36 with the above attachment error, Y-, M-, C- and BK-color registration marks are formed on the intermediate transfer belt 6. The registration marks are detected by the registration sensors 12A and 12B arranged at the positions corresponding to the image heights of 150 and −150 mm, and the image forming units 10Y, 10M, 10C, and 10K are controlled.

After control of the image forming units 10Y, 10M, 10C, and 10K, the positional shift amounts in the main scanning direction of the Y-, M- and C-color registration marks with respect to the BK-color registration marks are checked by using the image sensor CCD.

Figure 7A:
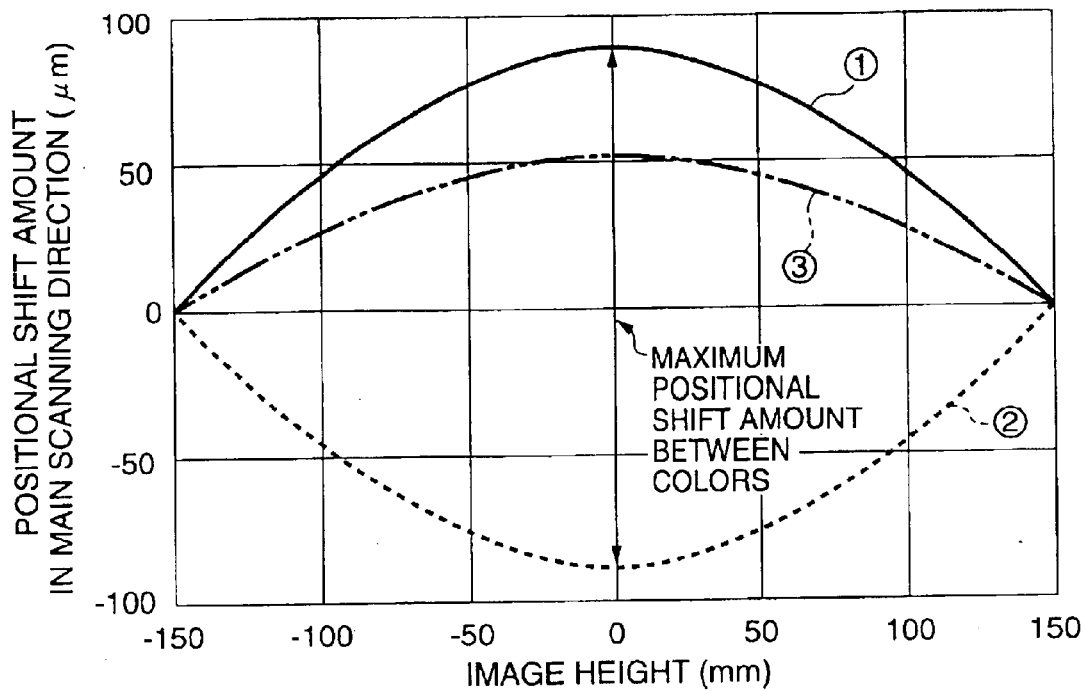
FIGS. 7A and 7B are graphs showing examples of a partial lateral magnification difference generated by the shift of an f(θ) lens in the X or Y direction.

FIG. 7A is a graph showing an example of a partial lateral magnification difference (before movement of the sensors) generated by the attachment shifts of the f(θ) lens 36 in the X or Y directions. The abscissa in FIG. 7A represents the image height. The ordinate in FIG. 7A represents the positional shift amounts in the main scanning direction of the Y-, M- and C-color registration marks with respect to the BK-color registration marks. FIG. 7A individually shows the positional shift amounts in the main scanning direction between the BK-color registration marks and the Y-, M- and C-color registration marks. For example, a curve ① in FIG. 7A indicates the positional shift amount of the Y-color registration marks with respect to the BK-color registration marks. A curve ② indicates the positional shift amount of the M-color registration marks with respect to the BK-color registration marks. A curve ③ indicates the positional shift amount of the C-color registration marks with respect to the BK-color registration marks.

In a state wherein the registration sensors 12A and 12B are arranged at the positions corresponding to the image heights of −150 and 150 mm, respectively, the positional shift amounts in the main scanning direction between BK-color and other respective colors (① to ③) at the image heights of −150 and 150 mm are 0 μm. This is because the image forming units 10Y, 10M, 10C, and 10K are controlled to nullify the positional shift amounts at the image heights of −150 and 150 mm.

In step A4 in FIG. 3, the registration sensors 12A and 12B are moved toward the position corresponding to the image height of 0 mm by ΔL and ΔL', respectively, along the sensor attachment position candidate line 40. The values ΔL and ΔL' are, e.g., 30 mm.

In step A5 in FIG. 3, the registration marks are detected by the registration sensors 12A and 12B arranged above the positions corresponding to the image heights of −120 and 120 mm, and the image forming units 10Y, 10M, 10C, and 10K are controlled. The positional shift amounts in the main scanning direction between the BK-color registration marks and the Y-, M- and C-color registration marks are checked.

Figure 7B:
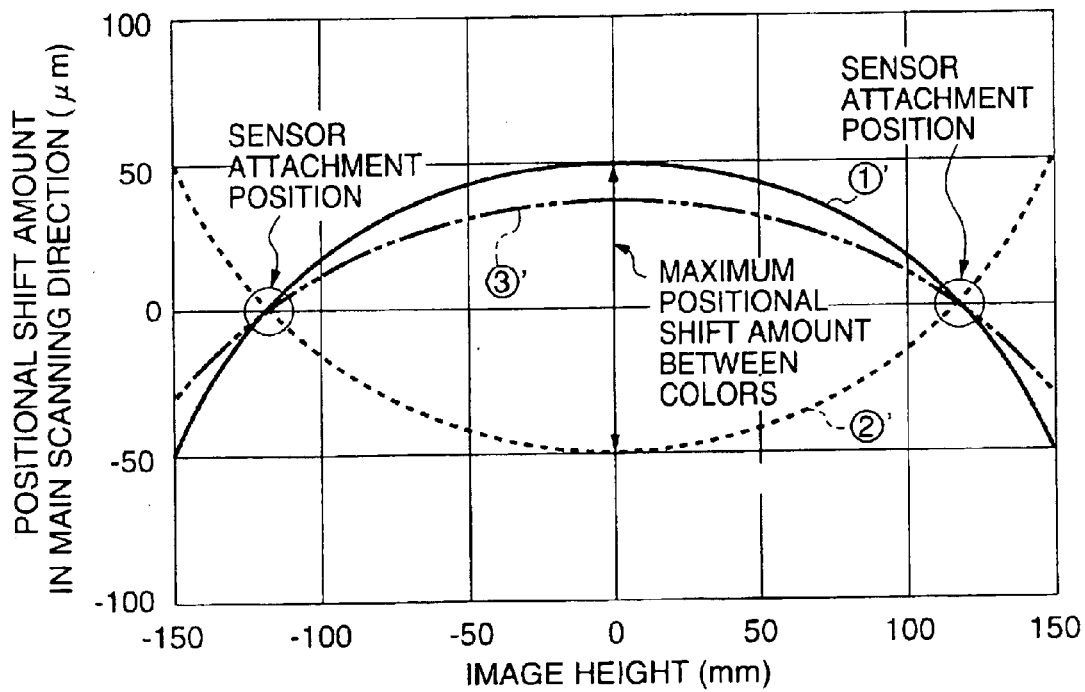

FIG. 7B is a graph showing an example of a partial lateral magnification difference (after movement of the sensors) generated by the attachment shifts of the f(θ) lens 36 in the X or Y directions. The abscissa in FIG. 7B represents the image height. The ordinate in FIG. 7B represents the positional shift amounts in the main scanning direction of the Y-, M- and C-color registration marks with respect to the BK-color registration marks. FIG. 7B individually shows the positional shift amounts in the main scanning direction between the BK-color registration marks and the Y-, M- and C-color registration marks.

For example, a curve ①' in FIG. 7B indicates the positional shift amount of the Y-color registration marks with respect to the BK-color registration marks. A curve ②' indicates the positional shift amount of the M-color registration marks with respect to the BK-color registration marks. A curve ③' indicates the positional shift amount of the C-color registration marks with respect to the BK-color registration marks.

For all the curves ①' to ③' in FIG. 7B, the maximum value of the positional shift amounts in the image height range of −150 mm to 0 mm is equal to the positional shift amount at the image height of −150 mm, and the maximum value of the positional shift amounts in the image height range of 0 mm to 150 mm is equal to the positional shift amount at the image height of 150 mm (step A6). For this reason, positions that oppose the color image formation surface at the image heights −120 mm and 120 mm are determined as the attachment positions of the registration sensors 12A and 12B (step A7). Sensor attachment position determination by using the shifts of the f(θ) lens 36 in the X or Y directions is thus completed. That is, the registration sensor attachment position is fixed in the stage of designing the image forming apparatus.

Figure 8:
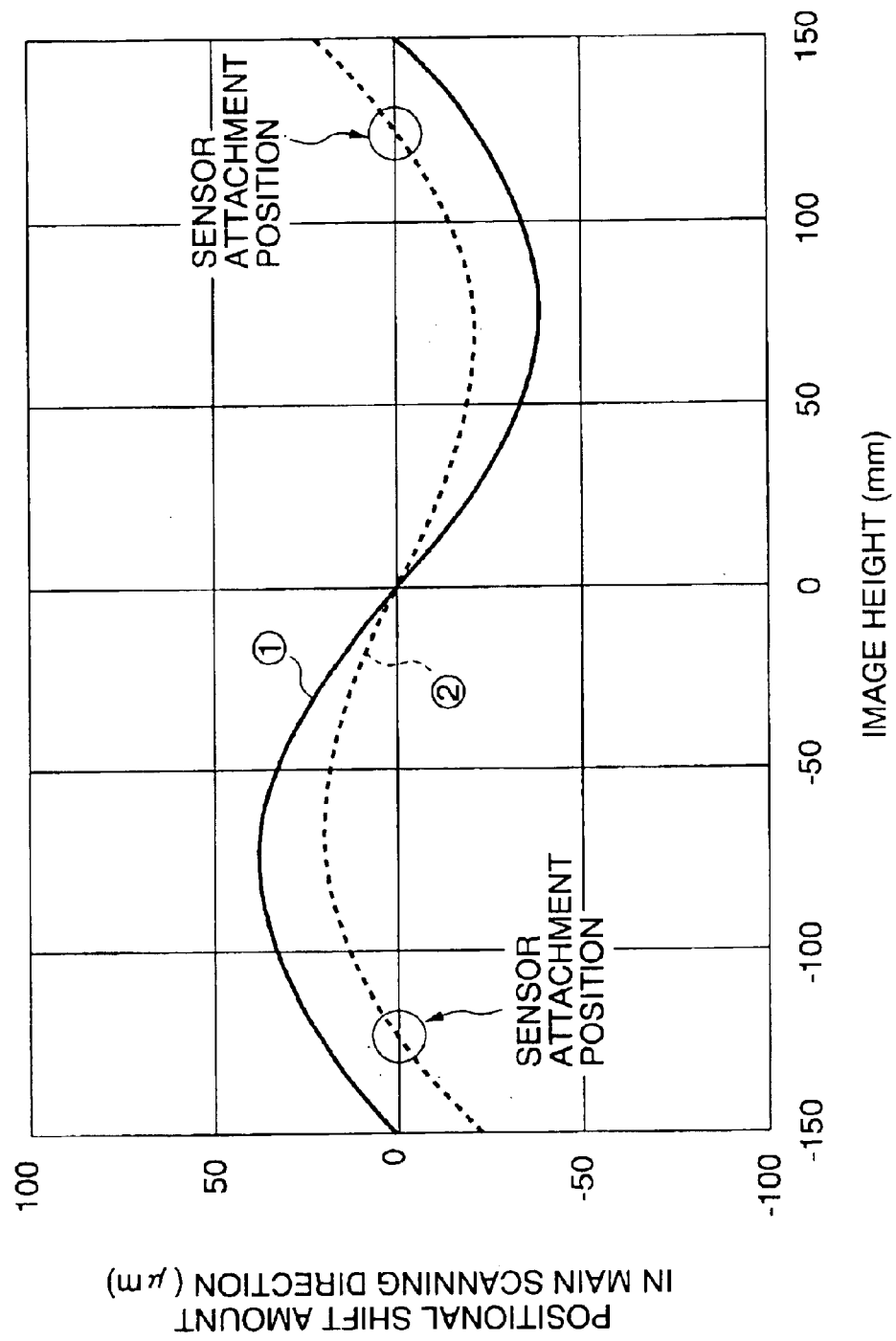
FIG. 8 is a graph showing an example of a partial lateral magnification difference generated by the exit angle shift of a laser beam that exits from a collimator unit.

Similarly, the attachment positions of the registration sensors 12A and 12B may be determined by using, as parameters, the exit angle shift of the laser beam that exits from the collimator unit 32. FIG. 8 is a graph showing an example of a partial lateral magnification difference generated by the exit angle shift of the laser beam that exits from the collimator unit 32. The abscissa in FIG. 8 represents the image height. The ordinate in FIG. 8 represents the positional shift amounts in the main scanning direction between BK-color and other respective colors.

A curve ① shown in FIG. 8 indicates the positional shift amounts in the main scanning direction between BK-color and other respective colors, which are checked in step A3 in FIG. 3. A curve ② shown in FIG. 8 indicates the positional shift amounts in the main scanning direction between BK-color and other respective colors, which are checked in step A5 in FIG. 3.

Even when the attachment positions of the registration sensors 12A and 12B are to be determined by using, as parameters, the exit angle shift of the laser beam that exits from the collimator unit 32, the registration sensors 12A and 12B are arranged at specific attachment positions (e.g., the image heights of −120 and 120 mm) at which the maximum value of the positional shift amounts in the image height range of −150 mm to 0 mm is equal to the positional shift amount at the image height of −150 mm, and the maximum value of the positional shift amounts in the image height range of 0 mm to 150 mm is equal to the positional shift amount at the image height of 150 mm. Accordingly, the partial lateral magnification difference between the colors can be minimized, and a color image with minimum color misregistration can be formed.

Figure 9:
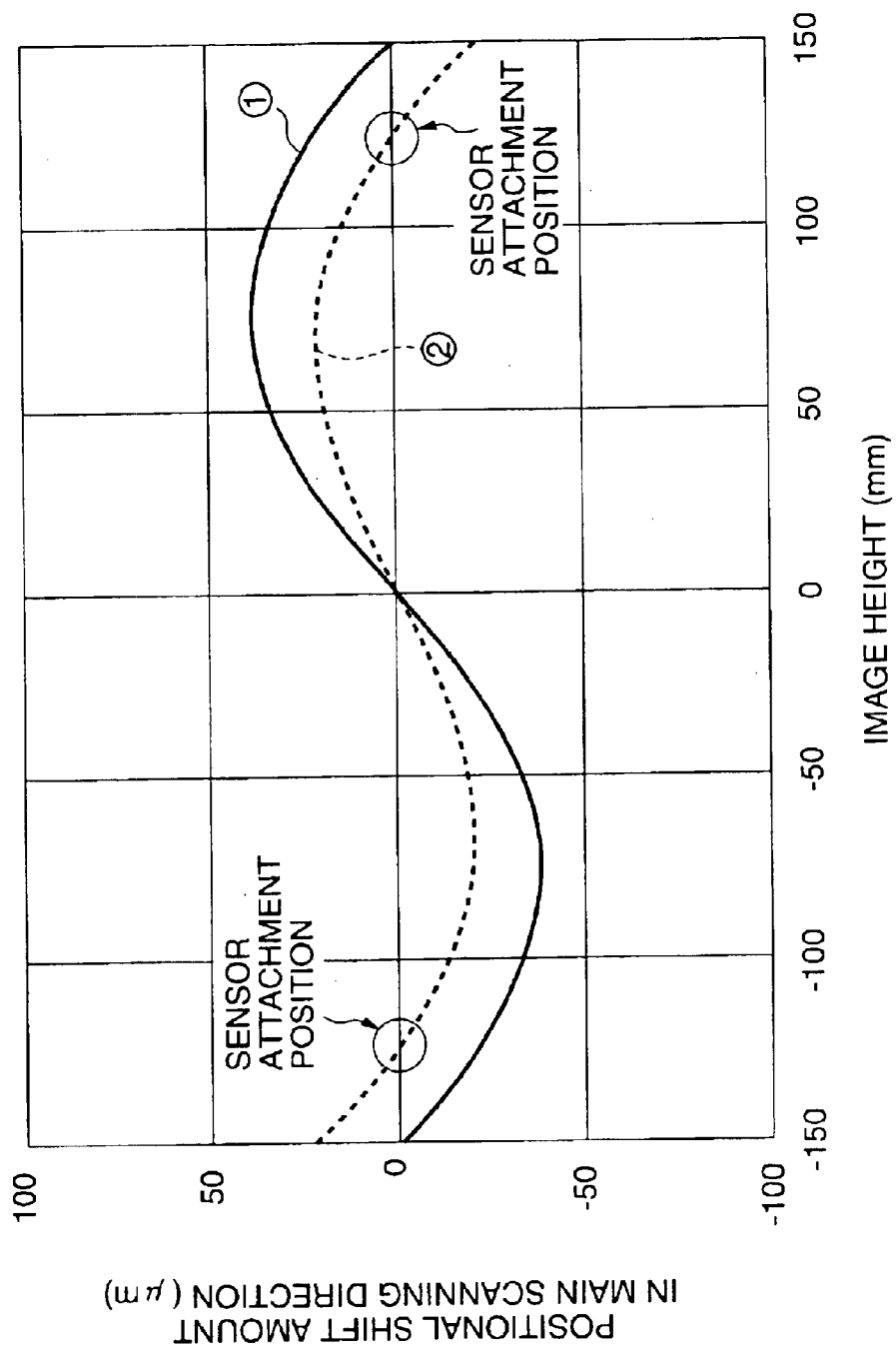
FIG. 9 is a graph showing an example of a partial lateral magnification difference generated by an increase in internal temperature of the color image forming apparatus main body.

In addition, the sensor attachment positions may be determined by using, as parameters, a change in temperature (an increase in internal temperature) of the color image forming apparatus main body 101. FIG. 9 is a graph showing an example of a partial lateral magnification difference generated by an increase in internal temperature of the color image forming apparatus main body 101. The abscissa in FIG. 9 represents the image height. The ordinate in FIG. 9 represents the positional shift amounts in the main scanning direction between BK-color and other respective colors.

A curve ① shown in FIG. 9 indicates the positional shift amounts in the main scanning direction between BK-color and other respective colors, which are checked in step A3 in FIG. 3. A curve ② shown in FIG. 9 indicates the positional shift amounts in the main scanning direction between BK-color and other respective colors, which are checked in step A5 in FIG. 3.

Even when the sensor attachment positions are to be determined by using, as parameters, an increase in internal temperature of the color image forming apparatus main body 101, the registration sensors 12A and 12B are arranged at specific attachment positions (e.g., the image heights of −120 and 120 mm) at which the maximum value of the positional shift amounts in the image height range of −150 mm to 0 mm is equal to the positional shift amount at the image height of −150 mm, and the maximum value of the positional shift amounts in the image height range of 0 mm to 150 mm is equal to the positional shift amount at the image height of 150 mm. Accordingly, the partial lateral magnification difference between the colors can be minimized, and a color image with minimum color misregistration can be formed.

As described above, according to the method of determining the attachment positions of the registration sensors 12A and 12B of the present invention, the registration sensors 12A and 12B are moved along the attachment position candidate line defined in the main scanning direction. The relationship between the attachment positions of the registration sensors 12A and 12B and the formation positional shifts of the color image is checked. Specific attachment positions on the sensor attachment position candidate line, at which the color misregistration of the color image at the side edge portions of the intermediate transfer belt 6 becomes equal to the maximum value of the color misregistration at portions except the side edge portions, are found. The registration sensors 12A and 12B are arranged at positions that satisfy the attachment positions and oppose the color image formation surface of the intermediate transfer belt 6.

Hence, the color image forming apparatus main body 101 can be controlled to correct color overlay on the basis of color image detection signals by the registration sensors 12A and 12B. Accordingly, the color overlay of the color images can be corrected to eliminate the absolute amount difference the color misregistration between the central portion and the two side edge portions of the intermediate transfer belt 6.

In this embodiment, the registration sensors 12A and 12B are moved symmetrically with respect to the optical axis corresponding to the central portion in the widthwise direction of the intermediate transfer belt 6 and positioned. The movement lengths and attachment positions of the registration sensors 12A and 12B may be asymmetrical with respect to the optical axis, i.e., $\Delta L \neq \Delta L'$. The values $\Delta L$ and $\Delta L'$ can be arbitrarily independently set.

Further, in this embodiment, the two registration sensors 12A and 12B are arranged at positions opposing the color image formation surface in correspondence with the image heights of −120 and 120 mm. However, the number of registration sensors is not limited to two. For example, three registration sensors may be arranged. In the case of three registration sensors, when the third registration sensor is arranged on the sensor attachment position candidate line and at the position corresponding to the image height of 0 mm, i.e., a position corresponding to the central portion in the widthwise direction of the intermediate transfer belt 6, the image forming units 10Y, 10M, 10C, and 10K can be more accurately controlled by making use of the correction means 5Y, 5M, 5C and 5K. This is because the third registration sensor is arranged at the position corresponding to the image height of 0 mm in the registration sensor attachment position fixed in the stage of design, it becomes possible to correct the partial lateral magnification difference at the image height of 0 mm due to attachment dispersion of parts by making use of the correction means 5Y, 5M, 5C and 5K, and thereby enabling more accurate control for eliminating color misregistration.

It should be noted that, in case of two registration sensors, it is not necessary to provide the correction means 5Y, 5M, 5C and 5K in the body of the image forming apparatus, but necessary to provide them in the stage of designing the image forming apparatus at which the registration sensor attachment position is fixed.

In this embodiment, the relationship between "image height" and the "positional shift amounts in the main scanning direction between BK-color and other respective colors" is checked using, as parameter, various factors such as the shifts of the image forming units 10Y, 10M, 10C, and 10K in the direction of the optical axis, the shift of the f(θ) lens 36 in the X or Y directions, the exit angle shift of the laser beam that exits from the collimator unit 32, or an increase in internal temperature of the color image forming apparatus main body 101. Accordingly, the attachment positions of the registration sensors 12A and 12B are determined.

However, the object to be checked is not limited to the "positional shift amounts in the main scanning direction between BK-color and other respective colors". For example, the attachment positions of the registration sensors 12A and 12B may be determined in accordance with the flowchart shown in FIG. 3 by checking the "positional shift amounts in the sub scanning direction between BK-color and other respective colors". Even in this case, the above-described various factors can be used as parameters.

Figure 10A:
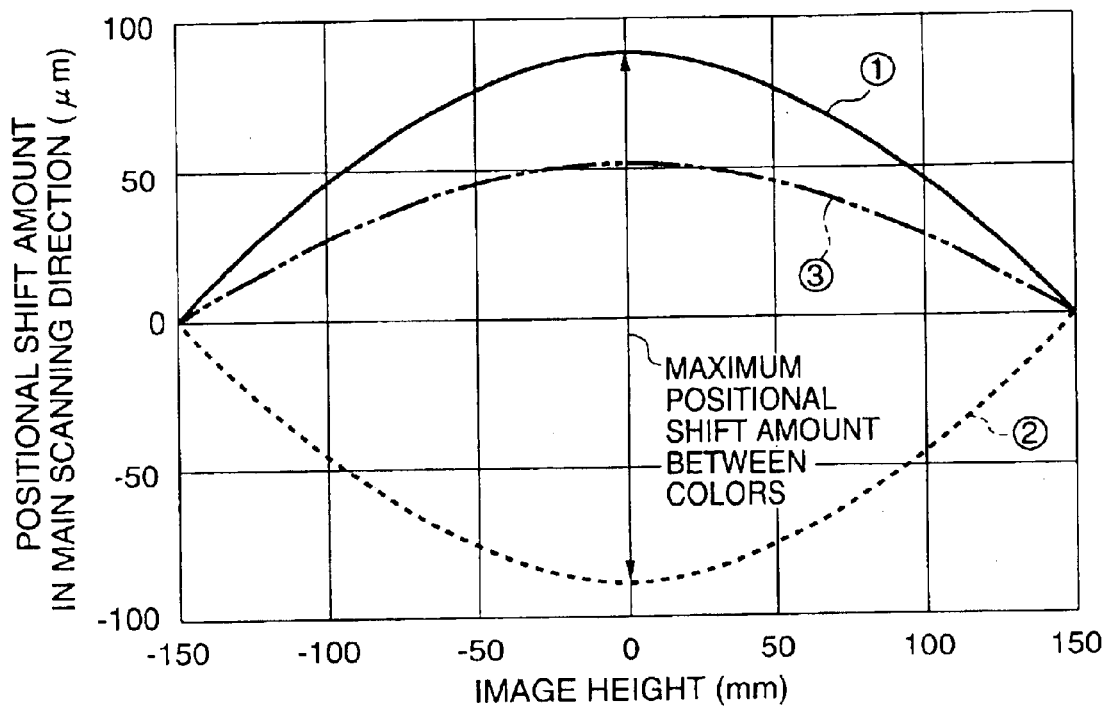
FIGS. 10A and 10B are graphs showing examples of a scanning line bend due to various factors.

FIG. 10A is a graph showing an example of a scanning line bend (before movement of the sensors) due to various factors. The abscissa in FIG. 10A represents the image height. The ordinate in FIG. 10A represents the positional shift amounts in the sub scanning direction between the BK-color registration marks and the Y-, M- and C-color registration marks. FIG. 10A individually shows the positional shift amounts in the sub scanning direction between the BK-color registration marks and the Y-, M- and C-color registration marks. For example, a curve ① in FIG. 10A indicates the positional shift amount in the sub scanning direction of between BK-color and Y-color. A curve ② indicates the positional shift amount in the sub scanning direction of between BK-color and M-color. A curve ③ indicates the positional shift amount in the sub scanning direction between BK-color and C-color.

In a state wherein the registration sensors 12A and 12B are arranged at the positions corresponding to the image heights of −150 and 150 mm, respectively, to oppose the image formation surface, the positional shift amounts in the sub scanning direction between BK-color and other respective colors (① to ③) at the image heights of −150 and 150 mm are 0 μm (skew adjustment).

Figure 10B:
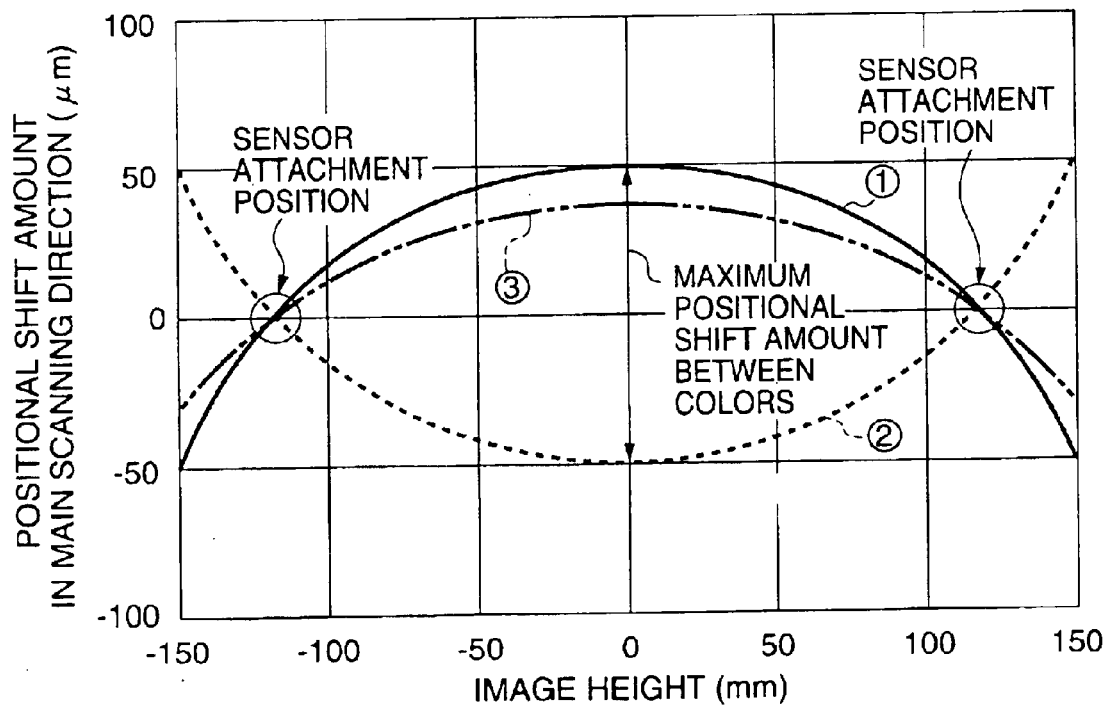

FIG. 10B is a graph showing an example of the scanning line bend (after movement of the sensors) due to various factors. The abscissa in FIG. 10B represents the image height. The ordinate in FIG. 10B represents the positional shift amounts in the sub scanning direction between the BK-color registration marks and the Y-, M- and C-color registration marks. A curve ①' in FIG. 10B indicates the positional shift amount in the sub scanning direction between. BK-color and Y-color. A curve ②' indicates the positional shift amount in the sub scanning direction between BK-color and M-color. A curve ③' indicates the positional shift amount in the sub scanning direction between BK-color and C-color.

As shown in FIG. 10B, for all the curves ①' to ③', the maximum value of the positional shift amounts in the image height range of −150 mm to 0 mm is equal to the positional shift amount at the image height of −150 mm, and the maximum value of the positional shift amounts in the image height range of 0 mm to 150 mm is equal to the positional shift amount at the image height of 150 mm. For this reason, positions that oppose the color image formation surface at the image heights −120 and 120 mm are determined as the attachment positions of the registration sensors 12A and 12B. Accordingly, the scanning line bend can be minimized, and a color image with minimum color misregistration can be formed.

The above-described object to be checked may be defined as the color misregistration amounts between BK-color and other respective colors in the main and sub scanning directions", and the registration sensor attachment positions may be determined in accordance with the flowchart in FIG. 3. Alternatively, two or three or more of the factors such as "shifts of the image forming units 10Y, 10M, 10C, and 10K in the direction of the optical axis", "shift of the f(θ) lens 36 in the X or Y directions", "exit angle shift of the laser beam that exits from the collimator unit 32", and "increase in internal temperature of the color image forming apparatus main body 101" may be used as parameters.

Figure 11:
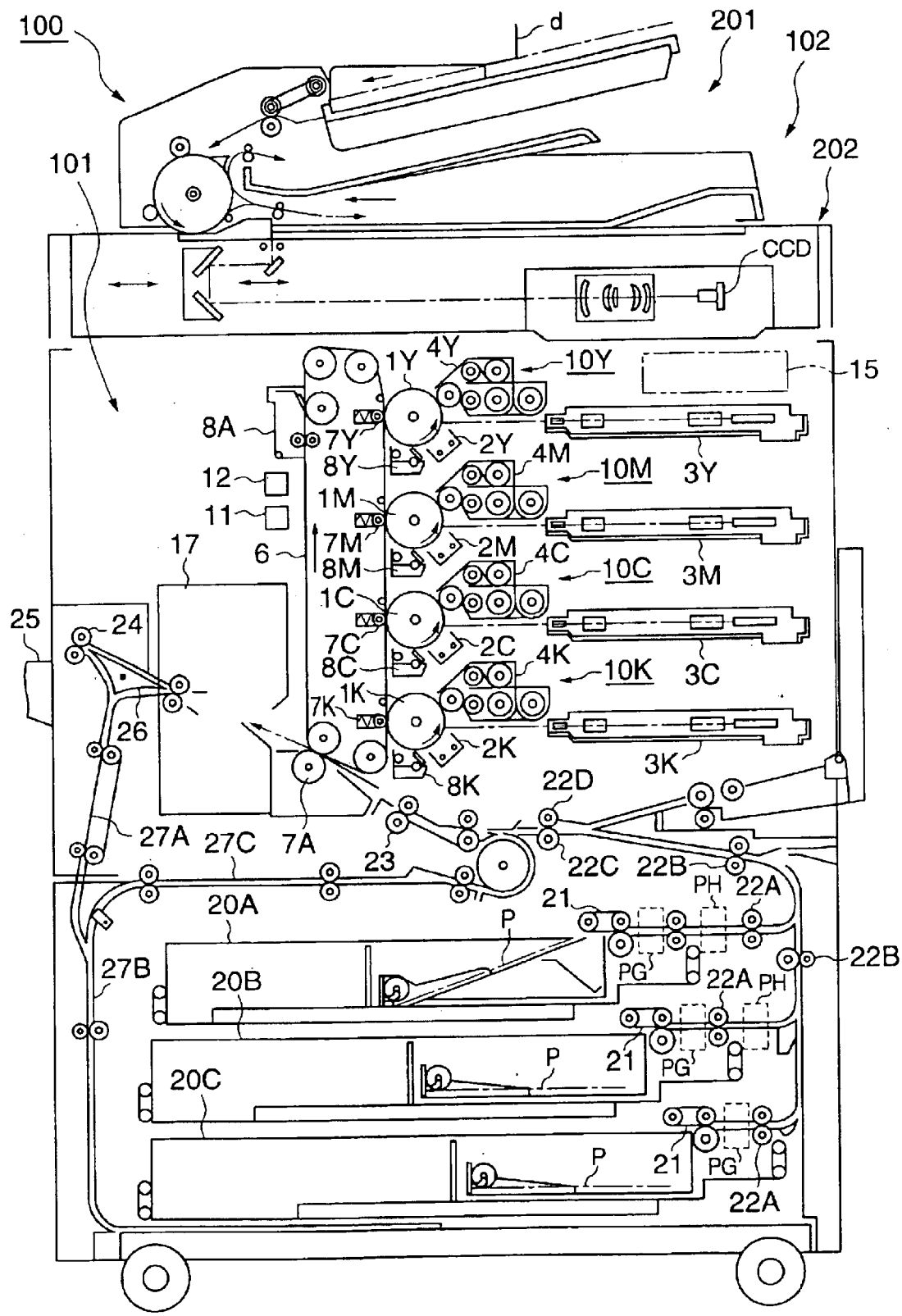
FIG. 11 is a view showing the arrangement of a color image forming apparatus having the color image forming apparatus main body according to the first embodiment of the present invention.

FIG. 11 is a view showing the arrangement of the color image forming apparatus 100 having the color image forming apparatus main body 101 according to the first embodiment of the present invention.

In this arrangement, the color image forming apparatus 100 is constituted by the image forming apparatus main body 101 in which the attachment positions of the registration sensors 12A and 12B are determined in accordance with the flowchart in FIG. 3 and an image reading apparatus having an original read function. An example wherein a color image is formed by using the color image forming apparatus 100 is assumed.

As shown in FIG. 11, the color image forming apparatus 100 comprises the above-described image forming apparatus main body 101, an image reading apparatus 102, and paper feed cassettes 20A, 20B, and 20C. The image reading apparatus 102 formed from an automatic document feeding unit 201 and original image scanning exposure unit 202 is arranged on the image forming apparatus main body 101. An original d placed on the original table of the automatic document feeding unit 201 is conveyed by a conveyance means. The image on one surface or images on both surfaces of the original are scanned and exposed by the optical system of the original image scanning exposure unit 202 and read by an image sensor CCD.

The analog signal obtained by photoelectrical conversion by the image sensor CCD is subjected to analog processing, A/D conversion, shading correction, and image compression by an image processing section (not shown) to generate image information. The image information is sent to the scanning optical units 3Y, 3M, 3C, and 3K.

The automatic document feeding unit 201 shown in FIG. 11 has an automatic double-sided original conveyance means. The automatic document feeding unit 201 is designed to continuously read the contents of a number of originals d fed from the original table and store the original contents in a storage means (electronic RDH function). The electronic RDH function is conveniently used to cause a copy function to copy the contents of a number of originals or a facsimile function to transmit a number of originals.

A color image forming method by the color image forming apparatus 100 will be described. Images of the respective colors, which are formed by the image forming units 10Y, 10M, 10C, and 10K as examples of image forming means, are sequentially transferred onto the rotating intermediate transfer belt 6 by primary transfer rollers 7Y, 7M, 7C, and 7K applied with a primary transfer bias (not shown) having a polarity (positive polarity in this embodiment) opposite to that of the toners used (primary transfer), so that a synthesized color image (color toner image) is formed. A paper sheet P stored in the paper feed cassette 20A, 20B, or 20C is fed by sending rollers 21 and paper feed rollers 22A, which are arranged in each of the paper feed cassettes 20A, 20B, and 20C, and conveyed to secondary transfer rollers 7A through conveyance rollers 22B, 22C, and 22D and registration rollers 23. The color image is transferred at once from the intermediate transfer belt 6 to one surface (obverse surface) of the paper sheet P (secondary transfer).

The paper sheet P having the transferred color image is subjected to fixing processing by a fixing unit 17, picked up by delivery rollers 24, and placed on an external delivery tray 25. The residual toners on the circumferential surfaces of the photosensitive drums 1Y, 1M, 1C, and 1K after transfer are removed by cleaning means 8Y, 8M, 8C, and 8K. Then, the next image forming cycle starts.

In the double-side image formation mode, the paper sheet P having the image formed on one surface (obverse surface) and delivered from the fixing unit 17 is fed to a circulating paper path 27A on the lower side. The paper sheet P is reversed through a reversing conveyance path 27B serving as a paper re-feed mechanism (ADU mechanism) and passes through a paper re-feed conveyance section 27C which joins to the original path at the paper feed roller 22D. The circulating paper path 27A, reversing conveyance path 27B, and paper re-feed conveyance section 27C are branched from the sheet delivery path by a branch means 26 and construct the paper conveyance means.

The paper sheet P that is reversed and conveyed is conveyed to the secondary transfer rollers 7A again through the registration rollers 23 so that a color image (color toner image) is transferred at once to the other surface (reverse surface) of the paper sheet P. The paper sheet P having the transferred color image is subjected to fixing processing by the fixing unit 17 (or a fixing unit 17A), picked up by the delivery rollers 24, and placed on the external delivery tray 25.

After the color image is transferred to the paper sheet P by the secondary transfer rollers 7A, the intermediate transfer belt 6 separates the paper sheet P with a curvature. The residual toners on the intermediate transfer belt 6 are removed by an intermediate transfer belt cleaning means 8A. In forming images, preferably, a thin paper sheet of about 52.3 to 63.9 kg/m$^2$ (1,000 pieces), a normal paper sheet of about 64.0 to 81.4 kg/m$^2$ (1,000 pieces), a thick paper sheet of about 83.0 to 130.0 kg/m$^2$ (1,000 pieces), or a cardboard of about 150.0 kg/m$^2$ (1,000 pieces) is used as the paper sheet P, a linear velocity of about 80 to 350 mm/sec is set, and environmental conditions including a temperature of about 5° C. to 35° C. and a humidity of about 15% to 85% are set. The thickness of the paper sheet P (paper thickness) is about 0.05 to 0.15 mm.

The registration sensors 12A and 12B whose attachment positions are determined in accordance with the flowchart in FIG. 3 are arranged upstream of the cleaning means 8A described above and on the left side of the intermediate transfer belt 6. The registration sensors 12A and 12B are designed to detect the positions of the registration marks formed on the intermediate transfer belt 6 and generate the position detection signal S. The control unit 15 arranged in the image forming apparatus main body 101 is designed to execute color registration mark detection processing on the basis of the position detection signal S.

As described above, according to the color image forming apparatus 100 of the present invention, the registration sensors 12A and 12B which detect the color misregistration of a color image formed on the intermediate transfer belt 6 are arranged at positions that satisfy attachment positions at which the color misregistration of the color image at the side edge portions of the intermediate transfer belt 6 becomes equal to the maximum value of the color misregistration at portions except the side edge portions and oppose the color image formation surface of the intermediate transfer belt 6. Hence, color overlay correction can be optimized such that the color misregistration between the central portion and the side edge portions of the intermediate transfer belt 6 is eliminated. The color misregistration on the entire color image formation surface can be minimized.

In the first embodiment, the intermediate transfer belt 6 has been exemplified as an example of a transfer body having an endless belt shape. However, the transfer body is not limited to this.

Figure 12:
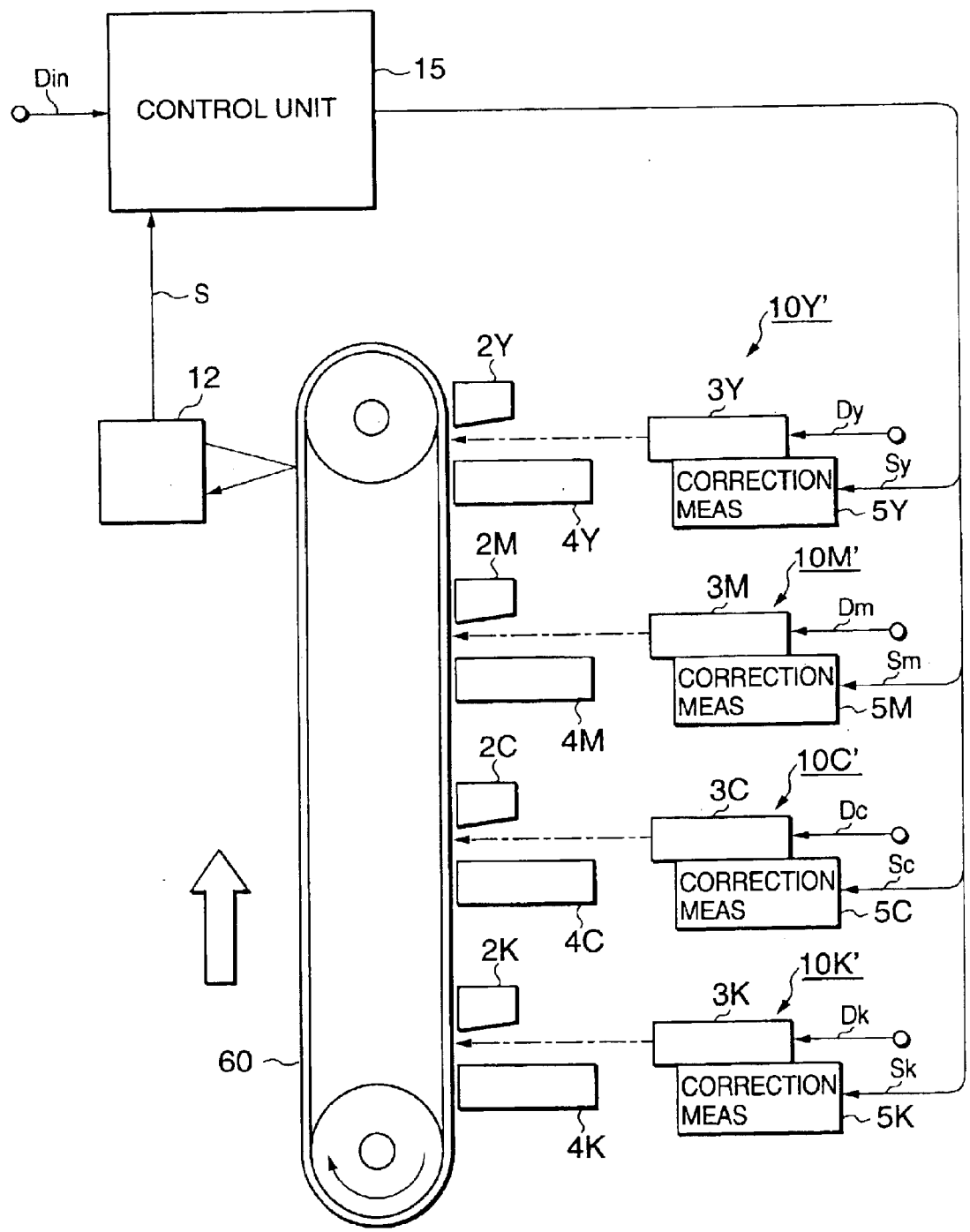
FIG. 12 is a block diagram showing the arrangement of a color image forming apparatus main body according to the second embodiment of the present invention.

As the second embodiment of the present invention, in place of the intermediate transfer belt 6 of the first embodiment, a photosensitive belt 60 shared by four image forming systems, as shown in FIG. 12, may be used, and a color image may be used on the photosensitive belt 60. The same reference numerals as in FIG. 2 denote the same parts in FIG. 12, and a detailed description thereof will be omitted.

Even in a color image forming apparatus main body 101' according to the second embodiment of the present invention shown in FIG. 12, the attachment positions of registration sensors 12 are determined and optimized in accordance with the flowchart shown in FIG. 3. Since image forming units 10Y', 10M', 10C' and 10K' are controlled on the basis of a position detection signal S from the registration sensors 12, the partial lateral magnification difference between Y-, M-, C- and BK-colors or scanning line bend can be minimized. Hence, a color image with minimum color misregistration can be formed.

It should be further noted that the above-described sensor attachment position determining method of the present invention can be attained also by carrying out a ray tracing with an optical simulation software.

What is claimed is:

1. A method of determining an attachment position of a color misregistration detection sensor for use in an image forming apparatus which overlays colors on the basis of arbitrary image information to form a color image on an endless-belt-shaped transfer body that is rotatable in a predetermined direction, comprising the steps, which are carried out in a stage of designing the image forming apparatus, of:

checking a relationship between the attachment position of the sensor and a formation positional shift of the color image by moving the sensor along an attachment position candidate line that is defined in advance in another direction perpendicular to the rotational direction of the transfer body;

finding a specific attachment position on the sensor attachment position candidate line, at which color misregistration of the color image at a side edge portion of the transfer body becomes equal to a maximum value of color misregistration at a portion except the side edge portion; and fixing the sensor at a position that satisfies the found specific attachment position and opposes a color image formation surface of the transfer body.

2. A method according to claim 1, wherein in the step of checking the relationship between the attachment position of the sensor and the formation positional shift of the color image, when the rotational direction of the transfer body is defined as a sub scanning direction, and said another direction is defined as a main scanning direction, at least a pair of sensors which are temporarily arranged on the sensor attachment position candidate line and at two side edge portions, respectively, of the transfer body are moved so as to be closed together along the main scanning direction from the two side edge portions, respectively, of the transfer body toward a central portion in a widthwise direction of the transfer body, thereby checking the relationship between the attachment positions of the sensors and the formation positional shift of the color image in the main scanning direction.

3. A method according to claim 1, wherein in the step of checking the relationship between the attachment position of the sensor and the formation positional shift of the color image, when the rotational direction of the transfer body is defined as a sub scanning direction, and said another direction is defined as a main scanning direction, at least a pair of sensors which are temporarily arranged on the sensor attachment position candidate line and at two side edge portions, respectively, of the transfer body are moved so as to be closed together along the main scanning direction from the two side edge portions, respectively, of the transfer body toward a central portion in a widthwise direction of the transfer body, thereby checking the relationship between the attachment positions of the sensors and the formation positional shift of the color image in the sub scanning direction.

4. A method according to claim 1, wherein the relationship between the attachment position of the sensor and the formation positional shift of the color image is checked by using, as a parameter, a small positional shift amount of a scanning optical unit arranged in the image forming apparatus in a direction of an optical axis.

5. A method according to claim 1, wherein the relationship between the attachment position of the sensor and the formation positional shift of the color image is checked by using, as a parameter, an internal temperature of the image forming apparatus.

6. A method according to claim 1, wherein the relationship between the attachment position of the sensor and the formation positional shift of the color image is checked by using, as a parameter, a small positional shift amount of an imaging lens arranged in the image forming apparatus.

7. A method according to claim 1, wherein the relationship between the attachment position of the sensor and the formation positional shift of the color image is checked by using, as a parameter, an exit angle of a laser beam that exits from a collimator unit arranged in the image forming apparatus.

8. A method according to claim 2, wherein the pair of sensors are attached to positions asymmetrical with respect to the central portion in the widthwise direction of the transfer body.

9. A method according to claim 3, wherein the pair of sensors are attached to positions asymmetrical with respect to the central portion in the widthwise direction of the transfer body.

10. An image forming apparatus which overlays colors on the basis of arbitrary image information to form a color image, comprising:
   an endless-belt-shaped transfer body which is rotatable in a predetermined direction;
   image forming means for overlaying the colors on the basis of the image information to form the color image on said transfer body;
   color misregistration detection sensor means, arranged to be movable along an attachment position candidate line that is defined in advance in another direction perpendicular to the rotational direction of said transfer body, for detecting color misregistration of the color image formed on said transfer body by said image forming means; and
   control means for controlling said image forming means to correct color overlay on the basis of a detection signal of the color image by said sensor means,
   wherein said sensor means is fixed at a position that satisfies a specific attachment position at which color misregistration of the color image at a side edge portion of said transfer body becomes equal to a maximum value of color misregistration at a portion except the side edge portion and opposes a color image formation surface of said transfer body.

11. An apparatus according to claim 10, wherein said sensor means comprises at least a pair of registration sensors which are temporarily arranged on the sensor attachment position candidate line and at two side edge portions, respectively, of said transfer body, and, in a stage of designing the image forming apparatus, said pair of registration sensors are moved so as to be closed together along the sensor attachment position candidate line from the two side edge portions, respectively, of said transfer body toward a central portion in a widthwise direction of said transfer body by a sensor moving means that is a virtual means used for convenience sake at the time of putting the method of determining the attachment position of the registration sensors into practice.

12. An apparatus according to claim 10, wherein said sensor means comprises three registration sensors, two of which are temporarily, and, in a stage of designing the image forming apparatus, said pair of registration sensors are moved so as to be closed together along the sensor attachment position candidate line from the two side edge portions, respectively, of said transfer body toward a central portion in a widthwise direction of said transfer body by a sensor moving means that is a virtual means used for convenience sake at the time of putting the method of determining the attachment position of the registration sensors into practice, and remaining one of which is arranged on the sensor attachment position candidate line and at a position corresponding to the central portion in the widthwise direction of said transfer body.

13. An image forming method of causing an image forming system to overlay colors on the basis of arbitrary image information to form a color image on an endless-belt-shaped transfer body that is rotatable in a predetermined direction, comprising the steps, which are carried out in a stage of designing the image forming apparatus, of:
   checking a relationship between the attachment position of the sensor and a formation positional shift of the color image by moving the sensor along a sensor attachment position candidate line that is defined in advance in another direction perpendicular to the rotational direction of the transfer body;
   finding a specific attachment position on the sensor attachment position candidate line, at which color misregistration of the color image at a side edge portion of the transfer body becomes equal to a maximum value of color misregistration at a portion except the side edge portion;
   fixing the sensor at a position that satisfies the found specific attachment position and opposes a color image formation surface of the transfer body; and controlling the image forming system to correct color overlay on the basis of a detection signal of the color image by the sensor.

14. A method according to claim 13, wherein in the step of checking the relationship between the attachment position of the sensor and the formation positional shift of the color image, when the rotational direction of the transfer body is defined as a sub scanning direction, and said another direction is defined as a main scanning direction, at least a pair of sensors which are temporarily arranged on the sensor attachment position candidate line and at two side edge portions, respectively, of the transfer body are moved so as to be closed together along the main scanning direction from the two side edge portions, respectively, of the transfer body toward a central portion in a widthwise direction of the transfer body, thereby checking the relationship between the attachment positions of the sensors and the formation positional shift of the color image in the main scanning direction.

15. A method according to claim 13, wherein in the step of checking the relationship between the attachment position of the sensor and the formation positional shift of the color image, when the rotational direction of the transfer body is defined as a sub scanning direction, and said another direction is defined as a main scanning direction, at least a pair of sensors which are temporarily arranged on the sensor attachment position candidate line and at two side edge portions, respectively, of the transfer body are moved so as to be closed together along the main scanning direction from the two side edge portions, respectively, of the transfer body to a central portion in a widthwise direction of the transfer body, thereby checking the relationship between the attachment positions of the sensors and the formation positional shift of the color image in the sub scanning direction.

16. A method according to claim 13, wherein the relationship between the attachment position of the sensor and the formation positional shift of the color-image is checked by using, as a parameter, a small positional shift amount of a scanning optical unit arranged in the image forming apparatus in a direction of an optical axis.

17. A method according to claim 13, wherein the relationship between the attachment position of the sensor and the formation positional shift of the color image is checked by using, as a parameter, an internal temperature of the image forming apparatus.

18. A method according to claim 13, wherein the relationship between the attachment position of the sensor and the formation positional shift of the color image is checked by using, as a parameter, a small positional shift amount of an imaging lens arranged in the image forming apparatus.

19. A method according to claim 13, wherein the relationship between the attachment position of the sensor and the formation positional shift of the color image is checked by using, as a parameter, an exit angle of a laser beam that exits from a collimator unit arranged in the image forming apparatus.

* * * * *